US008097837B2

(12) United States Patent
Taplan et al.

(10) Patent No.: US 8,097,837 B2
(45) Date of Patent: Jan. 17, 2012

(54) METHOD OF MAKING INTERCHANGEABLE GLASS CERAMIC TOPS FOR A COOKING STOVE

(75) Inventors: Martin Taplan, Rheinboellen (DE); Ioannis Kosmas, Stadecken-Elsheim (DE); Wolfgang Schmidbauer, Mainz (DE); Torsten Gabelmann, Wiesbaden (DE); Sascha Backes, Ruedesheim (DE)

(73) Assignee: Schott AG, Mainz (DE)

( * ) Notice: Subject to any disclaimer, the term of this patent is extended or adjusted under 35 U.S.C. 154(b) by 903 days.

(21) Appl. No.: 12/059,026

(22) Filed: Mar. 31, 2008

(65) Prior Publication Data

US 2008/0237222 A1 Oct. 2, 2008

Related U.S. Application Data

(63) Continuation of application No. 11/682,451, filed on Mar. 6, 2007, now abandoned.

(30) Foreign Application Priority Data

Mar. 11, 2006 (DE) ........................ 10 2006 011 315

(51) Int. Cl.
*H05B 3/10* (2006.01)
*H05B 3/68* (2006.01)
*B23B 17/00* (2006.01)
*C23C 8/00* (2006.01)

(52) U.S. Cl. ..................... 219/548; 219/460.1; 428/210; 501/14

(58) Field of Classification Search .... 219/443.1–468.2, 219/548; 428/210, 426–429; 501/4, 7, 11–14
See application file for complete search history.

(56) References Cited

U.S. PATENT DOCUMENTS

| | | | | | |
|---|---|---|---|---|---|
| 4,497,700 | A | * | 2/1985 | Groth et al. | 204/192.27 |
| 5,070,045 | A | * | 12/1991 | Comte et al. | 501/4 |
| 5,270,517 | A | * | 12/1993 | Finley | 219/203 |
| 5,994,674 | A | * | 11/1999 | Carter | 219/452.11 |
| 6,051,816 | A | * | 4/2000 | Wilkins | 219/448.19 |
| 2002/0084263 | A1 | | 7/2002 | Wennemann et al. | |

FOREIGN PATENT DOCUMENTS

| | | |
|---|---|---|
| DE | 25 06 931 | 9/1976 |
| DE | 24 37 026 | 10/1977 |
| DE | 200 19 210 | 1/2001 |
| DE | 201 06 167 | 7/2001 |
| DE | 10 2004 002 766 | 8/2005 |
| DE | 10 2004 023 847 | 12/2005 |
| EP | 1 505 354 | 2/2005 |

* cited by examiner

*Primary Examiner* — Sang Paik
(74) *Attorney, Agent, or Firm* — Michael J. Striker

(57) ABSTRACT

In the method of manufacturing a cooking stove its stove top can be equipped with different glass ceramic tops, which each have at least one cooking area, which is heated by a radiant heating body cooperating with a temperature-limiting adjusting device, which limits a surface temperature of the glass ceramic top. To economically and individually adjust the IR transmission of a glass ceramic top with a higher IR transmittance to that of a lower IR transmittance corresponding to that of another glass ceramic top so that they are interchangeable, the glass ceramic top with the higher IR transmittance is provided with an absorbing and/or reflecting coating. When the glass ceramic tops are interchangeable, either can be used in a given cooking stove without changing the expensive temperature-limiting device.

11 Claims, 3 Drawing Sheets

METHOD OF MAKING INTERCHANGEABLE GLASS CERAMIC TOPS FOR A COOKING STOVE

CROSS-REFERENCE

This is a continuation of U.S. patent application Ser. No. 11/682,451, which was filed on Mar. 6, 2007 now abandoned. This continuation application describes the same invention as described in the aforesaid US Patent Application, which provides the basis for a claim of priority of invention for the invention claimed hereinbelow under 35 U.S.C. 120. The invention described and claimed hereinbelow is also described in German Patent Application DE 10 2006 011 315.2, filed Mar. 11, 2006, in Germany. The subject matter of the aforementioned German Patent Application is explicitly incorporated herein by reference and this German Patent Application provides the basis for a claim of priority for the invention described and claimed hereinbelow under 35 U.S.C. 119.

BACKGROUND OF THE INVENTION

1. The Field of the Invention

The present invention relates to a method of making a cooking stove top, which can be equipped with at least two different glass ceramic tops with different IR spectral transmittance (type A, type B), which each have at least one cooking area, which is heated from below by means of a radiant heating body cooperating with a temperature-limiting adjusting device, which limits the surface temperature of the stove top installed in the cooking stove to a maximum value.

2. Related Art

Cooking stoves with a glass ceramic plate providing a cooking surface, a so-called stove top, have been on the market for many years in different forms. These systems are embodied as built-in cooking units, as table-top-cooking units, or as free standing cooking ranges. They typically have several cooking areas, also several cooking locations.

The radiant heating bodies used as heaters for these stove tops are predominantly electrical devices. The energy transfer from the source of the heat through the glass ceramic top to the cooking vessel bottom occurs by heat radiation. The resistor wire of the radiant heating bodies is heated up to a temperature of about 1300 K. One part of the emitted heat radiation from the heating coil goes directly through the glass ceramic top into the cooking vessel bottom or the surroundings in the vicinity of a cooking area when there is no cooking vessel on the cooking area. The remaining part of the emitted heat radiation is absorbed in the glass ceramic and heats the glass ceramic in the vicinity of the cooking area.

Halogen heating bodies are also used in a small percentage of the cooking stove tops. Halogen heating bodies operate according to the same principle as conventional radiant heating bodies. Generally in this case the heating coil is arranged in a quartz tube surrounded by a protective gas. The protective gas prevents contact of the heating coil with oxygen so that it is possible for the heating coil to operate at temperatures up to about 2400 K.

Different types of heating coils produce different radiation spectra, since they operate at different temperatures. The portion of the heat radiation that goes directly though the glass ceramic top and the portion that heats the cooking area are also different for the different types of heating bodies. Also different fractions of the input energy are delivered as primary heat radiation that passes directly through the glass ceramic and/or is absorbed by the glass ceramic and as secondary radiation to the surroundings at the same nominal power.

Further development of cooking apparatus has resulted in the use of the currently different glass ceramic types with different transmission properties. Because of required product differentiation current cooking apparatus manufacturers use different types of glass ceramic material in one and the same base structure or top structure using the "Panel Forming Engineering" techniques known from the automobile industry. The different radiant heating bodies must be individually adjusted to the different glass ceramics in order to maintain the existing safety standards and the desired minimum cooking times because of the different transmission properties of the different glass ceramic materials and the different emissivities of the different radiant heating bodies. The adjustment of the heating body output occurs by means of a temperature-limiting device, which limits the surface temperature of the cooking surface to a maximum value. This limiting device is required in order to protect the glass ceramic cooking surface and the cooking surface surroundings from overheating by limiting them to a maximum allowable temperature. It is especially important in the case of a built-in kitchen to limit the rear wall and side walls of the kitchen fittings along one wall of a kitchen to a maximum allowable temperature. The specifications for the surrounding temperatures at the rear wall and side walls of the kitchen fittings along one wall of a kitchen are given by safety standard described in EN 60335. The EN 60335, part 1, section 19, describes a test for determining the rear wall and side wall temperatures of the kitchen fittings arranged along one kitchen wall. A maximum temperature increase of 150 K is permitted during this test. The limiting temperature values of the individual heating bodies are determined by the ability of the glass ceramic used in the cooking unit to withstand high temperatures, but of course can also be determined by the temperature limits for the rear wall or side walls of the kitchen fittings.

These problems encountered when different glass ceramics are used currently may be practically solved only by separately storing the heating bodies for the different types of glass ceramics, which is contrary to the use of "Top or Plate Forming Engineering" methods and means high storage and logistics expenses.

To maintain and/or reduce the surrounding temperature of the rear wall and side walls of the cooking stove top DE 10 2004 023 847 A1 teaches formation of the underside of the glass ceramic cook top with lenses or prisms so that the primary heat radiation from the heating coil passing through the cooking area remains more focused in the vicinity of the cooking area and thus the temperature increase of the walls is reduced. The focusing of the primary heat radiation should occur by complex structuring of the glass ceramic underside. For example, structuring the glass ceramic top underside in the form of a Fresnel lens in the vicinity of the cooking area is proposed. Furthermore a sort of parallel prism structure is described, which of course can only act in one direction, either away from the rear wall or away from the side walls, but not away from both. However current cooking stove tops are currently made in a number of different outer geometries and equipped with different heating bodies. The selection of the heating body size and arrangement is currently almost completely arbitrary. The proposed formation of the cooking surface underside is not possible according to the current state of the art, since respective individual shaping rollers would be required for shaping the hot glass sheet of green glass to be ceramicized for each heating body and the product could not be further modified in subsequent processing steps. An additional disadvantage of a full-surface structuring of the underside of a glass ceramic cook top, for example with prisms or Fresnel lenses, is that a desired transparency of part of the cooking surface for display devices or the like is not possible.

SUMMARY OF THE INVENTION

It is an object of the present invention to provide a method of manufacturing cooking stove tops of the above-described type, which can be equipped with different glass ceramic tops having different IR transmittances but which have their different IR transmittances individually adjusted with economic and variable means, such as coatings, so that the resulting stove tops have substantially the same IR transmittance.

It is another object of the present invention to provide a cooking stove top comprising a glass ceramic top of type A with means for modifying its IR spectral transmission properties so that they are the same or very similar to the IR spectral transmission properties of a cooking stove top comprising another glass ceramic top of type B so that these two stove tops are interchangeable, i.e. so that the modified stove top made comprising a glass ceramic top of type A can be used in a cooking stove that is designed to employ the stove top made with the glass ceramic top of type B but without modifying any other parts of the cooking stove, such as the temperature-limiting device.

This object and others, which will be made more apparent hereinafter, are attained in a method of making a cooking stove top, which can be equipped with at least two different glass ceramic tops with different IR spectral transmittance (type A, type B), which each have at least one cooking area, which is heated from below by means of a radiant heating body cooperating with a temperature-limiting adjusting device, which limits the surface temperature of the stove top installed in the cooking stove to a maximum value.

According to the present invention the stove top comprises a glass ceramic top with a higher IR spectral transmittance (Type A) or a glass ceramic top with a lower IR spectral transmittance (Type B), but the one of the glass ceramic tops that has the higher IR spectral transmittance is provided with means for absorbing or reflecting infrared radiation in order to adjust the spectral IR transmittance so as to be the same or substantially the same as that of the other glass ceramic top with the lower IR spectral transmittance which is not provided with the aforesaid means for absorbing or reflecting infrared radiation, so that the temperature-limiting adjusting device of the radiant heating body can be retained in the cooking stove in which the stove top is installed without any changes.

The invention makes it possible to adjust the different IR transmission properties of different glass ceramic tops used in a cooking stove in a simple manner so that the different glass ceramic tops can be used interchangeably in the cooking stove, while retaining the same expensive temperature-limiting adjusting device that controls the radiant heating body in the cooking stove in order to keep the surround temperatures below a predetermined maximum value.

In one embodiment of the invention the adjustment is possible in a surprisingly simple manner by providing an IR-absorbing or IR-reflecting coating on an upper surface and/or on a bottom surface of the glass ceramic top. The IR-absorbing or IR-reflecting coating can extend over the entire upper and/or bottom surface or it can be applied in a structured pattern or grid. In this embodiment the manufacture of the raw glass panel is not influenced and it is still not "individualized" in regard to the adjustment of its transmission. The coating of the topside or bottom side of the glass ceramic can occur by known coating techniques according to the cooking surface size and heating body configuration designed for the cooking apparatus. Screen-printing methods have been accepted as standard for the upper surface coating of the cook top. Screen-printed coatings are also possible on the underside of the glass ceramic top. However spraying processes, sputtering techniques or the like can also be used in principle. Simple application of special decorative patterns, of cooking area markings, or simple fixing of the degree of coverage in order to achieve certain transmission values is a significant advantage to the screen-printing techniques.

A further possibility for adjusting the IR transmission and/or reducing the side wall temperatures of kitchen fittings arranged in a row comprises roughening the underside of the glass ceramic top. The roughening increases the surface area and produces a diffuse reflection. The roughening could be produced with a suitably formed lower side roller for the glass sheet during the raw glass manufacture or after that by sand blasting. In the latter case portions of the original surface on the bottom side of the glass ceramic could be kept smooth during the sand blasting by means of suitable masks or screens. These smooth portions could be used for signaling devices and displays, or for printed information.

Additional embodiments are claimed in the dependent claims appended hereinbelow.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
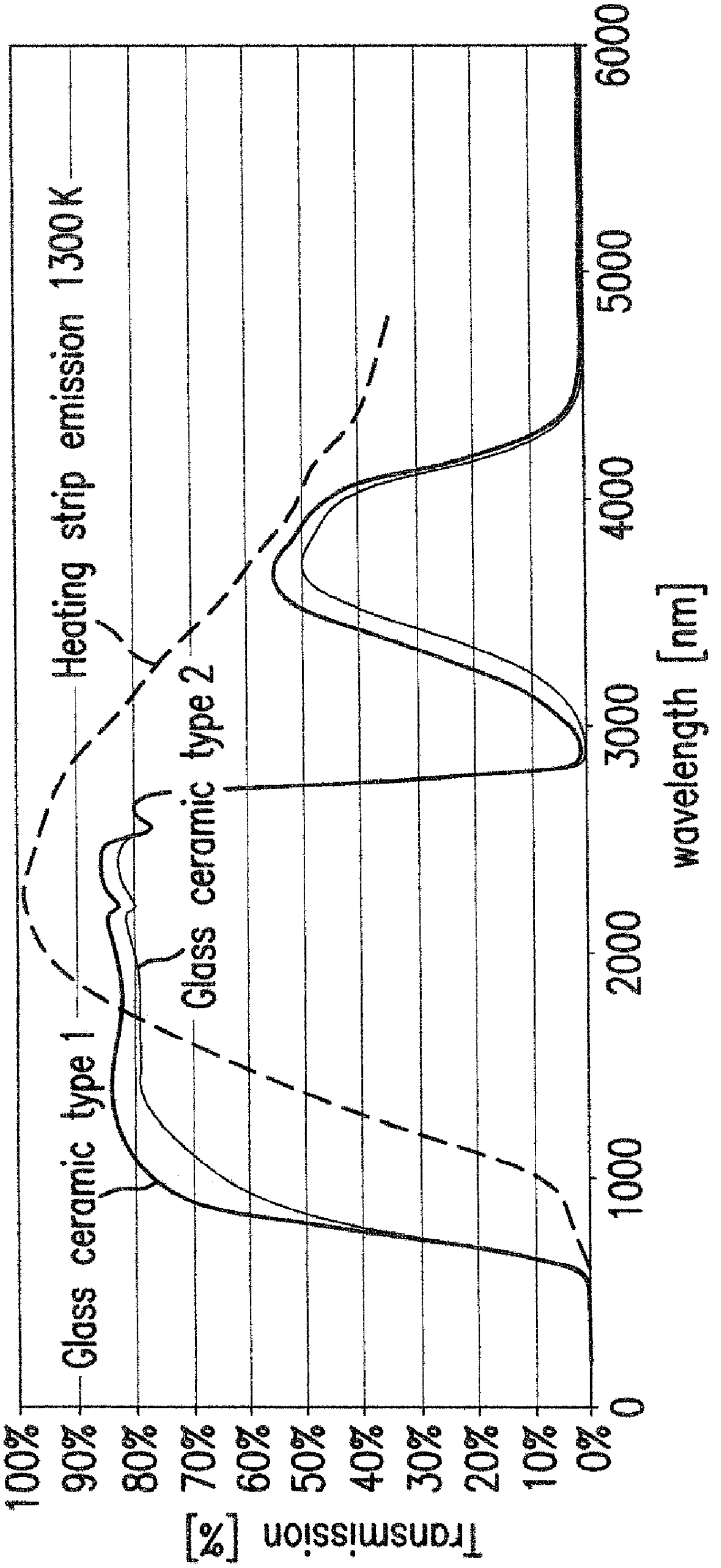
FIG. 1 PRIOR ART
FIG. 1 is a graphical illustration of the dependencies of the transmissions of two known types of glass ceramics on wavelength, which also shows the emission spectrum of a known heating strip with a radiation temperature of 1,300 K.

The emission spectrum of a heated strip with a radiation temperature of 1300 K is shown in FIG. 1. The transmission in % of two exemplary glass ceramics of type 1 and type 2 are also illustrated in FIG. 1. The heating strip has a radiation intensity maximum at 2200 nm. The type 1 glass ceramic has a transmission of about 83% at this point and the type 2 glass ceramic has a transmission of about 78%.

The basic concept of the present invention is to reduce the transmission of a glass ceramic top made with the type 1 glass ceramic by providing a suitable coating or by roughening the surface in the vicinity of the cooking area sufficiently so that it corresponds to the transmission of a glass ceramic top made with the type 2 glass ceramic. Thus the glass ceramic top made with type 1 glass ceramic but provided with the coating or roughening of the surface is interchangeable with the glass ceramic top made with the type 2 glass ceramic. As a result it can replace the glass ceramic top made of the type 2 glass ceramic in a cooking stove without changing the expensive temperature-limiting adjusting device or without changing the surrounding temperatures around the stove top. Enamel paints in different shapes, i.e. with different absorption and different surface coverage, are used according to the form of the surface and characteristics of the cooking areas. Laboratory experiments have shown that a full-surface coating of these enamel paints can produce a reduction of the IR transmission of up to about 50% depending on the type of paint that is employed. The total IR transmission of the stove top comprising the type 1 glass ceramic top can be adjusted to the IR transmission of the type 2 glass ceramic top by selection of an appropriate color of the paint and printed pattern.

The same effect may be obtained by a partially transparent or reflective coating on the underside of the glass ceramic top. Noble metal coatings (lustrous paints) comprising gold, platinum, and palladium components can reduce the heating body radiation by almost 100%. In this case an embossing or patterning of the coating and a predetermined coating coverage in the vicinity of the cooking area is required to adjust the IR transmission of the cook top.

Experiments have also shown that a $SnO_2$ coating on the underside can obtain the same effect. The IR transmission can also be adjusted when this coating is patterned in the form of a grid or a screen. Experiments have also shown that it is possible to adjust the transmission of the glass ceramic by adjusting the coating thickness.

Understandably one can also use this principle in order to handle the problem of a rear wall or side wall temperature that is too high. In a given cooking system the rear wall temperature can already be at or above its limiting value depending on the heating body that it is equipped with or on the heating body power. In this case also a reduction in the wall temperatures is possible by means of a specially designed patterned coating provided on the glass ceramic top according to the above-described embodiments without making any other changes in the cooking stove.

Figure 2:
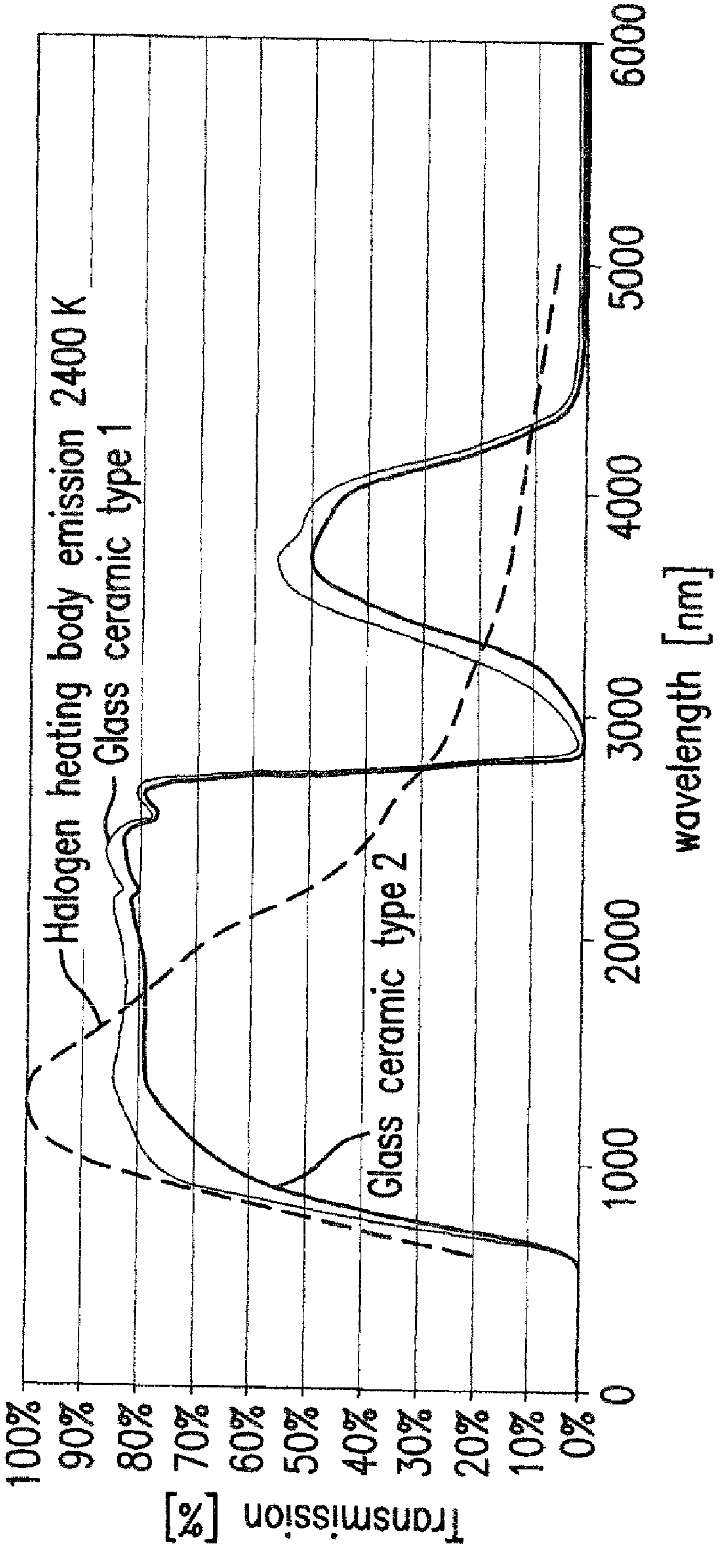
FIG. 2 PRIOR ART
FIG. 2 is a graphical illustration of the same dependencies of the transmissions of two known types of ceramics on wavelength as in FIG. 1, but shows the emission spectrum of a known heated halogen body with a radiation temperature of 2,400 K.

FIG. 2 is a graphical illustration similar to FIG. 1, but includes an illustration of the emission curve of a halogen heating body with a radiation temperature of 2400 K, in which the radiation intensity maximum is at about 1200 nm, instead of the emission curve of the heating body shown in FIG. 1. Since the areas of the transmission curves of the type 1 and type 2 glass ceramic overlapping with the area of the emission curve of the halogen heating body are different from the areas overlapping the area of the emission curve of the heating strip of FIG. 1, the fraction of primary radiation in the embodiment corresponding to FIG. 2 is different from that of the embodiment corresponding to FIG. 1. A slightly modified patterned coating or coating thickness would be used in the case of the heating body of FIG. 2 so that the glass ceramic of type 1 is completely replaceable by the glass ceramic of type 2.

Figure 3:
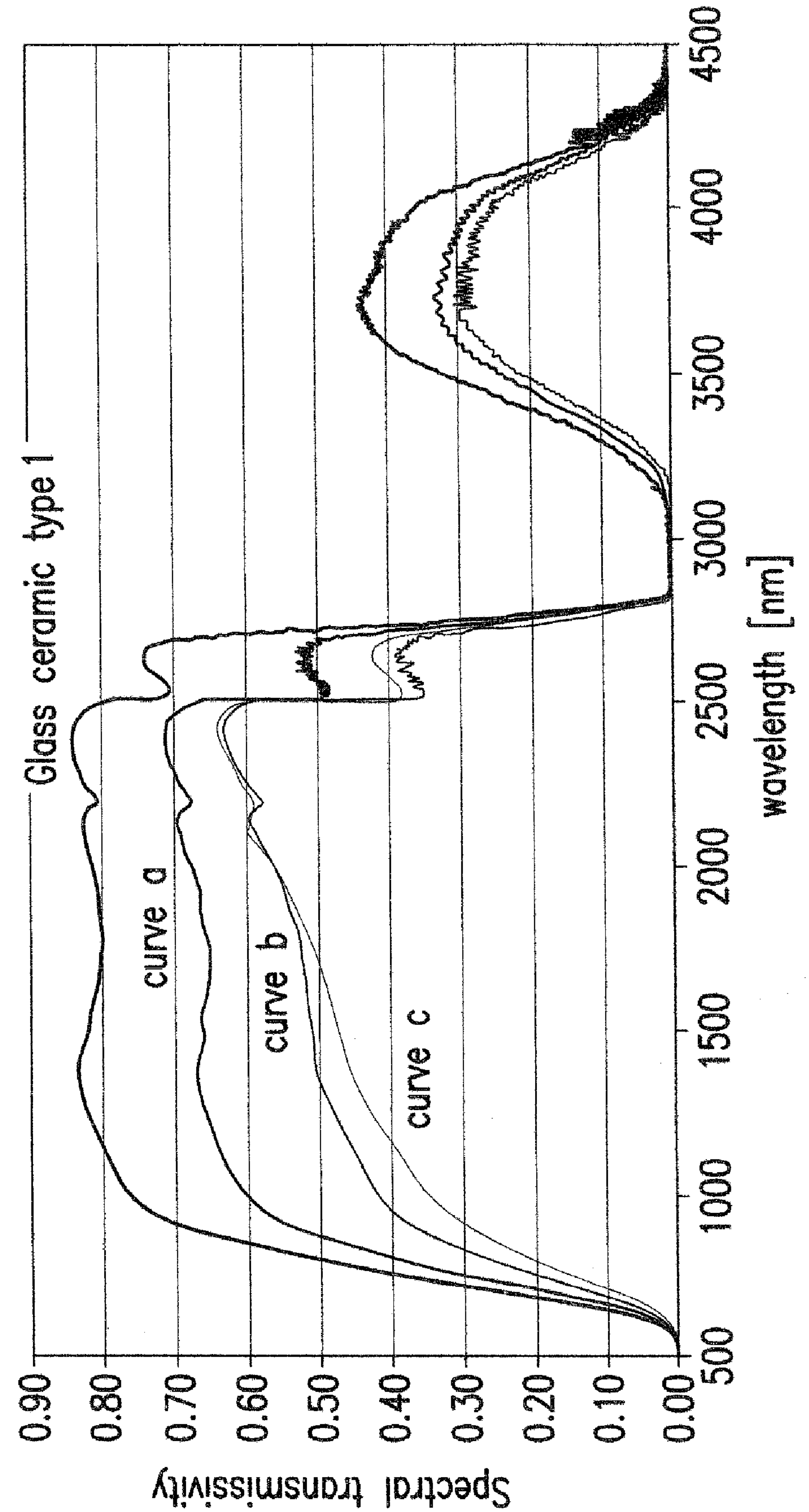
FIG. 3 is a graphical illustration of the same dependency of the transmission of a type 1 glass ceramic on wavelength as in FIG. 1, but with different full-surface enamel coatings a, b, and c of the present invention provided on the glass ceramic.

FIG. 3 is a graphical illustration showing the reduction of transmission of glass ceramic top made with a type 1 glass ceramic by different full-surface enamel coatings (curves a, b, c) according to the invention. The reduction of the transmission, especially in the case of the curves c and b, shows that there is great flexibility availability regarding the choice of patterned decoration and/or surface coating for adjustments of one type of glass ceramic to another.

The possible variations are even greater when a metallic coating with a reflectivity of almost 100% is used on the underside of the glass ceramic. Furthermore a combination of a coating on the underside and the topside in different patterns is conceivable.

While the invention has been illustrated and described as embodied in a method of making interchangeable glass ceramic tops for a cooking stove, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A method of manufacturing a cooking stove with a glass ceramic top providing a cooking surface, said cooking stove comprising at least one radiant heating body arranged below said glass ceramic top, a top structure for the glass ceramic top, and a temperature-limiting device cooperating with said at least one radiant heating body, which limits a surface temperature of the cooking surface to a maximum allowable value, said method of manufacturing comprising the steps of:

a) providing said cooking stove with said top structure;

b) providing a plurality of different glass ceramic tops with different infrared spectral transmittances for installation in said cooking stove with said top structure, said plurality including one of said different glass ceramic tops with a lowest infrared spectral transmittance of all of said different glass ceramic tops;

c) installing a temperature-limiting device in said cooking stove that would cooperate with said different glass ceramic top with said lowest infrared spectral transmittance to limit the surface temperature of the cooking surface to said maximum allowable value when said different glass ceramic top with said lowest infrared spectral transmittance is installed in said cooking stove;

d) selecting another one of said different glass ceramic tops with an infrared spectral transmittance greater than said lowest infrared spectral transmittance;

e) providing said another one of said different glass ceramic tops with means for absorbing or reflecting infrared radiation so as to adjust said infrared spectral transmittance of said another one of said different glass ceramic tops to said lowest infrared spectral transmittance; and then f) installing said another one of said different glass ceramic tops with said means for absorbing or reflecting infrared radiation according to step e) in said top structure of said cooking stove without any changes of the temperature-limiting device installed in the cooking stove in step c).

2. The method as defined in claim 1, wherein said means for absorbing or reflecting infrared radiation is an infrared-absorbing coating or an infrared-reflecting coating.

3. The method as defined in claim 2, wherein said infrared-absorbing coating or said infrared-reflecting coating is applied to and extends over an entire surface of said another one of said different glass ceramic tops.

4. The method as defined in claim 2, wherein said infrared-absorbing coating or said infrared-reflecting coating has a structured pattern or is in the form of a structured grid.

5. The method as defined in claim 2, wherein said infrared-absorbing coating or said infrared-reflecting coating is provided on a topside side and/or a bottom side of said another one of said different glass ceramic tops.

6. The method as defined in claim 2, wherein said infrared-absorbing coating or said infrared-reflecting coating is applied to said another one of said different glass ceramic tops by screen-printing.

7. The method as defined in claim 2, wherein said infrared-absorbing coating or said infrared-reflecting coating comprises an enamel.

8. The method as defined in claim 2, wherein said infrared-absorbing coating or said infrared-reflecting coating comprises a lustrous paint and said lustrous paint has gold, platinum and/or palladium components.

9. The method as defined in claim 2, wherein said infrared-absorbing coating or said infrared-reflecting coating comprises a $SnO_2$ coating and is provided on a bottom side of said another one of said glass ceramic tops.

10. The method as defined in claim 9, wherein said $SnO_2$ coating has a thickness selected to adjust said infrared spectral transmittance of said another one of said different glass ceramic tops so as to be compatible with said temperature limiting device.

11. The method as defined in claim 9, wherein said another one of said different glass ceramic tops has at least one infrared-reflecting roughened surface region on an underside thereof.

* * * * *